United States Patent [19]

Sauer

[11] 4,163,195

[45] Jul. 31, 1979

[54] VEHICLE ANTENNA AND WINDOW AMPLIFIER

[75] Inventor: Gerd Sauer, Aachen-Laurensberg, Fed. Rep. of Germany

[73] Assignee: Saint-Gobain Industries, Neuilly-sur-Seine, France

[21] Appl. No.: 829,779

[22] Filed: Sep. 1, 1977

[30] Foreign Application Priority Data

Sep. 4, 1976 [DE] Fed. Rep. of Germany ....... 2639947

[51] Int. Cl.[2] .......................... H04B 1/18; H01Q 1/32

[52] U.S. Cl. .................................... 325/313; 325/379; 325/383; 343/713

[58] Field of Search ................................ 343/711–713, 343/722; 325/312, 313, 379, 383, 377

[56] References Cited

U.S. PATENT DOCUMENTS

| | | | |
|---|---|---|---|
| 2,157,532 | 5/1939 | Foster | 325/313 |
| 3,576,576 | 4/1971 | Jensen | 343/712 |
| 3,587,017 | 6/1971 | Kurusu | 325/379 |
| 3,623,108 | 11/1971 | Du Bois et al. | 343/712 |
| 3,693,096 | 9/1972 | Dosey et al. | 325/383 |
| 3,771,159 | 11/1973 | Kawaguchi et al. | 343/713 |
| 3,810,180 | 5/1974 | Kunert et al. | 343/713 |
| 3,810,184 | 5/1974 | Bolcey et al. | 343/713 |
| 3,945,014 | 3/1976 | Kunert et al. | 343/713 |
| 3,971,030 | 7/1976 | Sauer | 343/713 |

*Primary Examiner*—Marc E. Bookbinder
*Attorney, Agent, or Firm*—Pennie & Edmonds

[57] ABSTRACT

A vehicle antenna window and amplifier are described comprising an antenna conductor located on or in a windshield and a high input impedance transistor amplifier circuit, these two components being mutually adjusted for amplification primarily in the two frequency bands ranging from 0.1 to 6 MegaHertz (MHz) and from 88 to 104 MHz.

23 Claims, 4 Drawing Figures

VEHICLE ANTENNA AND WINDOW AMPLIFIER

BACKGROUND AND SUMMARY OF THE INVENTION

This invention relates to a vehicle antenna window and amplifier especially suited for amplifying electromagentic signals in the two frequency bands ranging from 0.1 to 6 MHz and from 88 to 104 MHz. The first of these bands will be recognized as the long, medium and short wave band in which amplitude modulated (AM) signals are typically transmitted and the second as the ultra short wave band in which frequency modulated (FM) signals are ordinarily transmitted.

In the prior art, numerous circuit designs attempt to limit the amplification of received signals to only these two frequency bands so as to minimize interference and cross-modulation. Typical amplifier circuits include a separate channel for amplification of signals in each of these two bands comprising at least a transistor amplifier and input and output frequency filters for each channel.

In the present invention the need for separate AM-band and FM-band amplifier channels is avoided by providing a $\pi$ circuit comprising two capacitors and an inductance between the base of the antenna conductor and the input of the transistor amplifier. The parameters of the $\pi$ circuit are chosen to obtain the best signal-to-noise ratio at the transistor input in the FM-band.

By using the $\pi$ circuit in combination with an antenna window and a transistor amplifier, one can obtain, at lower cost, not only a good band-pass characteristic in the FM-band with good signal-to-noise ratio but also favorable band-pass characteristics in the AM-band. As a result, a single channel and therefore a single transistor may be used to amplify the signals in both these frequency ranges.

To ensure adequate signal amplification in the AM-band, the antenna conductor should have a parallel capacitance of approximately from 20 to 60 pF and preferably from 30 to 40 pF and a parallel impedance having a resistive component of approximately 250 KΩ. The transistor amplifier should have a very low input capacitance, below approximately 10 pF, and a high input impedance having a resistive component of approximately 300 KΩ.

In the FM-band, the antenna impedance is on the order of 300 Ω, considerably smaller than that of the amplifier. This antenna impedance is matched to the high input impedance of the amplifier by the $\pi$ circuit of the present invention.

Preferably, the antenna is T-shaped having a vertical conductor in the center of the windshield and a horizontal conductor parallel to and adjacent the upper edge of the window. The horizontal conductor is shaped as a loop. Preferably, there is a break in this loop at some point other than the center line of the window. This asymmetry improves the general reception characteristics of the antenna.

In a particular embodiment of the invention a dual gate field effect MOS transistor is used as the amplifier. Particularly good results are obtained when the G2 input of said MOS transistor is used as the control electrode and the G1 input is used to adjust the operating threshhold. As will be recognized, this configuration is the opposite of conventional usage. With such a field effect MOS transistor and a T-shaped antenna conductor having an output impedance of approximately 300 Ω in the FM-band, the preferred embodiment of the $\pi$ circuit has a first capacitance that is approximately 4 pF, an inductance that is 0.5 μH and a second capacitance that is 1 pF. In a particularly advantageous embodiment, the first capacitance of the $\pi$ circuit is provided by the capacitive effect of the impedance of the antenna base and the capacitance of the circuit conductors while the second capacitance is formed by the capacitance of the circuit conductors in conjunction with the input capacitance of the transistor amplifier. As a result, it is not necessary to provide discrete components for these two capacitances.

As another feature of the invention, the input of the $\pi$ circuit is preferably connected to the base of the antenna by a coupling capacitor having a cpacitance on the order of 20 pF. A coupling capacitor of such low capacitance has been observed to minimize the sensitivity of the amplifier to interference.

BRIEF DESCRIPTION OF THE DRAWINGS

These and other objects, features and elements of the invention will be more readily apparent from the following detailed description in which.

DETAILED DESCRIPTION OF THE DRAWINGS

Figure 1:
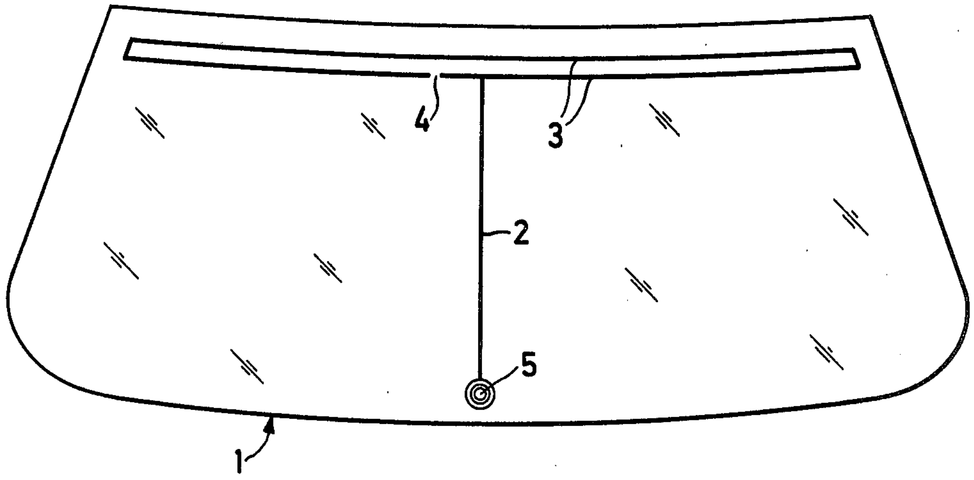
FIG. 1 is a schematic illustration of a preferred embodiment of an antenna conductor mounted on a windshield.

FIG. 1 depicts a motor vehicle windshield 1 on which an antenna conductor is located either by embedding it in the windshield in the case of a laminated window or depositing it on the surface in the form of a thin conductive ribbon as in the case of a safety windshield. The antenna conductor comprises a single wire vertical conductor 2 located in the middle of the windshield and a horizontal conductor 3 shaped as a loop extending along the upper edge of the windshield. The electrical path length of conductor 2 is equal to or greater than a quarter wavelength. In the loop there is a break 4 which makes the antenna electrically asymmetrical. Proper positioning of the break permits one to correct the directivity of the antenna to some extent and to optimize the performance of the antenna window and amplifier. At the lower end of vertical conductor 2 is an antenna base 5 which provides a connector between the antenna and an amplifier.

Figure 2:
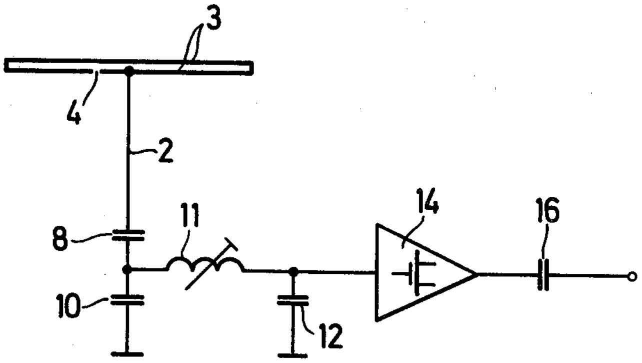
FIG. 2 is a schematic illustration of a preferred embodiment of the circuit of the present invention.

As shown in FIG. 2 the antenna is connected through a low-capacitance coupling capacitor 8 to a $\pi$ circuit which comprises a first capacitor 10, an inductance coil 11 and a second capacitor 12. The $\pi$ circuit is connected to a field effect MOS transistor amplifier 14 which can be one or more stages according to the desired amplification. The output of this amplifier is connected to an output capacitor 16 which connects it to a radio receiver. The total capacitance of capacitor 16 and that of the cable between the amplifier and the receiver is lower than 100 pF so that the input circuit of the receiver can be tuned in the AM-band.

Figure 3:
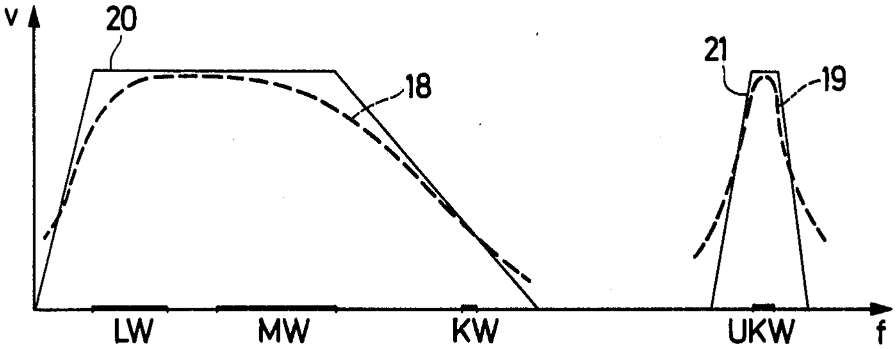
FIG. 3 is a schematic illustration of ideal and actual band pass characteristics.

FIG. 3 depicts the desired band pass curves 20, 21 for the AM and FM bands, respectively. The dotted curves 18 and 19 depict the band pass characteristics which have been obtained using the circuits of this invention. In order to get the best approximation to the ideal curves, capacitances 10 and 12 and inductance coil 11 should be resonance matched in the FM-band; and adjustments in the position of the band pass curve can be made by adjusting coil 11. In general, capacitances 10 and 12 are quite small and inductance coil 11 relatively large.

Appropriate values for capacitances 10 and 12 and inductance coil 11 can be calculated graphically using conventional impedance diagrams. The parameters should be selected so as to optimize the signal-to-noise ratio for the transistor amplifier at about the middle of the FM-band, i.e., at approximately 95 MHz. In performing such optimization efforts, I have found that capacitor 10 should be approximately 4.5 pF, the inductance of coil 11 should be 0.5 $\mu$H and capacitance 12 should be approximately 1.3 pF for the case of a dual gate field effect MOS transistor. Illustratively, the inductance of 0.5 $\mu$H is achieved with a coil having 21 turns of 0.3 mm diameter copper wire wound so that the inside diameter of the coil is 3.5 mm.

Advantageously, amplification in the circuit is less at lower frequencies than higher frequencies. This is caused partly by the low capacitance coupling capacitor 8 and partly by inductance coil 11.

Figure 4:
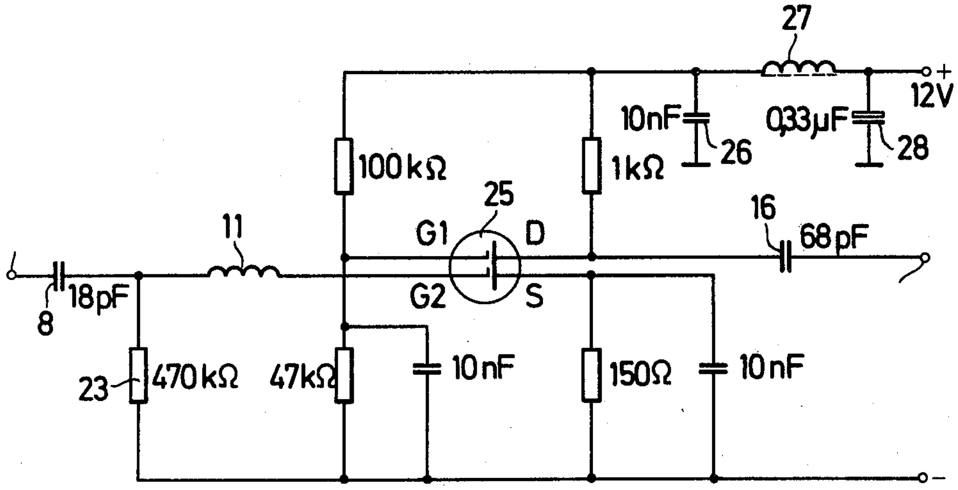
FIG. 4 is a schematic illustration of a preferred embodiment of an amplifier circuit used in the present invention.

FIG. 4 depicts a specific embodiment of the $\pi$ filter and amplifier of the present invention employing a dual gate field effect transistor amplifier 25. Rather than use discrete components for capacitances 10 and 12, it is preferable to use the stray capacitance available in the antenna base, circuit conductors and the input capacitance of the transistor amplifier. Consequently, capacitance 10 of FIG. 2 is achieved in the circuit of FIG. 4 by the stray capacitance of the antenna base and the circuit conductors between the antenna and inductance coil 11 while capacitance 12 is achieved by the stray capacitance of the circuit conductors between inductance coil 11 and transistor amplifier 25 as well as the input capacitance of transistor 25.

The coupling capacitor 8 at the input of the amplifier and the output capacitor 16 have capacitances of approximately 18 and 68 pF, respectively. The capacitance of the coupling capacitor and the antenna conductor together with resistor 23 determine the lower cut off frequency of the band pass region.

The field effect MOS transistor is a dual gate transistor such as the BF 900 MOSFET made by Texas Instruments in which input G2 acts as the control electrode while input G1 is used to adjust the operating threshhold. In contrast to G1, input G2 has a characteristic curve which is relatively flat instead of having a pronounced slope. As a result, the level of cross-modulation can be increased by more than 10 dB. As indicated above, this use of input G2 as a control electrode and G1 as the threshhold adjustment is the opposite of that in normal practice.

Advantageously, a filter comprising capacitors 26 and 28 and a ferrite core inductance coil 27 is used in the power supply circuit to minimize noise signals from the power supply.

As will be apparent to those skilled in the art my invention may be practiced using various modifications of the circuits above described and different circuit parameters.

What is claimed is:

1. An antenna window and amplifier circuit comprising:

an antenna conductor located on or in a windshield, said conductor comprising a vertical element having an electrical path length that is equal to or greater than a quarter wave length and a horizontal element shaped in the form of a loop and connected to said vertical element;

a high input impedance transistor amplifier;

a $\pi$ circuit connected between said antenna and an input to said transistor amplifier, said $\pi$ circuit comprising two capacitors and an inductance, the values of said capacitances and inductance being calculated to obtain the best signal/noise ratio at the input to the transistor amplifier at some point in the frequency range between 88 to 104 MegaHertz (MHz), said antenna conductor and said $\pi$ circuit being adjusted so that the signals amplified are found mainly in the AM broadcast band from 0.1 to 6 MegaHertz (MHz) and the FM broadcast band above 88 MHz.

2. The apparatus of claim 1 wherein the transistor amplifier comprises a dual gate field effect MOS transistor.

3. The apparatus of claim 2 wherein said MOS transistor has a G1 input and a G2 input and the G1 input is used to adjust the operating threshold while the G2 input acts as a control electrode.

4. The apparatus of claim 1 wherein the two capacitances of the $\pi$ circuit are approximately four picoFarads (pF) and 1 pF and the inductance is approximately 0.5 microHenries.

5. The apparatus of claim 4 wherein one of the capacitances of the $\pi$ circuit is formed by stray capacitance between the antenna and the inductance in the $\pi$ circuit and the other is formed by stray capacitance between said inductance and the input to the transistor amplifier as well as the input capacitance of said amplifier.

6. The apparatus of claim 1 wherein the antenna conductor has a parallel capacitance of 20 to 60 pF and a parallel impedance in the frequency range of 0.1 to 6 MHz which has a resistive component of approximately 250 kiloOhms (k$\Omega$).

7. The apparatus of claim 6 wherein the capacitance of the antenna conductor ranges from approximately 30 to 40 pF in the frequency range of 0.1 to 6 MHz.

8. The apparatus of claim 1 further comprising a coupling capacitor having a capacitance on the order of 20 pF which connects the antenna conductor to the $\pi$ circuit.

9. The apparatus of claim 1 wherein the antenna conductor further comprises an antenna base.

10. The apparatus of claim 9 wherein one of the capacitances of the $\pi$ circuit is formed by stray capacitance at the antenna base as well as between the antenna and the inductance in the $\pi$ circuit and the other is formed by stray capacitance between said inductance and the input to the transistor amplifier as well as the input capacitance of said amplifier.

11. The apparatus of claim 9 wherein the impedance of the antenna base is approximately 300 $\Omega$ in the frequency range of 88 to 104 MHz.

12. The apparatus of claim 1 wherein there is a break in the loop-shaped portion of the antenna conductor which break is located asymetrically with respect to the vertical conductor.

13. An antenna window and amplifier circuit comprising:

an antenna conductor located on or in a windshield, a vertical part of said conductor having an electrical path length that is equal to or greater than a quarter wave length, a parallel capacitance of 20 to 60 pF and a parallel impedance in the frequency range of 0.1 to 6 MHz which has a resistive component of approximately 250 kΩ;

a high input impedance transistor amplifier;

a π circuit connected between said antenna and an input to said transistor amplifier, said π circuit comprising two capacitors and an inductance, the values of said capacitances and inductance being calculated to obtain the best signal/noise ratio at the input to the transistor amplifier at some point in the frequency range between 88 to 104 MegaHertz (MHz), said antenna conductor and said π circuit being adjusted so that the signals amplified are found mainly in the AM broadcast band from 0.1 to 6 MegaHertz (MHz) and the FM broadcast band above 88 MHz.

14. The apparatus of claim 13 wherein the transistor amplifier comprises a dual gate field effect MOS transistor.

15. The apparatus of claim 14 wherein said MOS transistor has a G1 input and a G2 input and the G1 input is used to adjust the operating threshold while the G2 input acts as a control electrode.

16. An antenna window and amplifier circuit comprising:

an antenna conductor located on or in a windshield, said conductor being adapted to receive both signals in the AM broadcast band below 6 MegaHertz (MHz) and signals in the FM broadcast band above 88 MHz;

a high input impedance transistor amplifier;

a π circuit connected between said antenna and an input to said transistor amplifier, said π circuit comprising two capacitors and an inductance, the values of said capacitances and inductance being calculated to obtain the best signal/noise ratio at the input to the transistor amplifier at some point in the FM broadcast band above 88 MHz;

a coupling capacitor connected between said antenna conductor and the inductance of said π circuit; and a resistance connected between a power supply to said transistor amplifier and a point between said coupling capacitor and said inductance, the parallel capacitance and parallel impedance of the antenna conductor, the capacitance of said coupling capacitor, the value of said resistance and the capacitance and inductance of the elements of said π circuit being selected so as to provide pass bands in the AM broadcast band from 0.1 to 6 MHz and in the FM broadcast band above 88 MHz.

17. The apparatus of claim 16 wherein the transistor amplifier comprises a dual gate field effect MOS transistor.

18. The apparatus of claim 16 wherein said MOS transistor has a G1 input and a G2 input and the G1 input is used to adjust the operating threshold while the G2 input acts as a control electrode.

19. The apparatus of claim 16 wherein the antenna conductor has a parallel capacitance of 20 to 60 pF and a parallel impedance in the frequency range of 0.1 to 6 MHz which has a resistive component of approximately 250 kiloOhms (kΩ).

20. The apparatus of claim 16 wherein the coupling capacitor has a capacitance on the order of 20 pF.

21. The apparatus of claim 16 wherein the antenna conductor comprises a vertical element having an electrical path length that is equal to or greater than a quarter wave length and a horizontal element shaped in the form of a loop and connected at one point to said vertical element.

22. The apparatus of claim 21 wherein the loop constitutes a pair of substantially parallel horizontal conductors extending along the upper edge of the windshield and joined together at their extremities, said loop having a break which makes the antenna conductor electrically asymmetrical.

23. An antenna conductor located on or in a windshield, said conductor comprising a vertical element having a electrical path length that is equal to or greater than a quarter wave length and a horizontal element shaped in the form of a loop and connected at one point to said vertical element, said horizontal element comprising a pair of substantially parallel horizontal conductors extending along the upper edge of the windshield and joined together at their extremities, said loop having a break which makes the antenna conductor electrically asymmetrical.

* * * * *